United States Patent [19]

Hunt et al.

[11] 3,959,169

[45] May 25, 1976

[54] WATER SOLUTION OF QUATERNARY AMMONIUM ALKENE HALIDE

[75] Inventors: Walter G. Hunt, Bridgeton, Mo.; Leslie P. Kovats, Granite City, Ill.

[73] Assignee: Anheuser-Busch, Incorporated, St. Louis, Mo.

[22] Filed: Sept. 21, 1973

[21] Appl. No.: 399,286

[52] U.S. Cl............................. 252/182; 252/363.5; 252/364; 260/567.6 R; 260/567.6 M
[51] Int. Cl.² .......................................... C09K 3/00
[58] Field of Search................ 252/182, 363.5, 364; 260/567.6 R, 567.6 M

[56] References Cited
UNITED STATES PATENTS 3,624,070    11/1971    Hunt ............................ 260/233.3 R Primary Examiner—Benjamin R. Padgett
Assistant Examiner—Irwin Gluck
Attorney, Agent, or Firm—Gravely, Lieder & Woodruff

[57] ABSTRACT

This application relates to an improvement in the preparation of quaternary ammonium alkene halides which are used in the production of cationic starch. The quaternary ammonium alkene halide product is recovered in a water solution which reduces exposure to and handling of the product by production workers, both in the manufacturing plant and in its subsequent use in a starch processing plant.

10 Claims, No Drawings

WATER SOLUTION OF QUATERNARY AMMONIUM ALKENE HALIDE

BACKGROUND OF THE INVENTION

U.S. Pat. No. 3,624,070, assigned to the assignee of the present application, shows a process for making granular gelatinizable quaternary ammonium starch ethers by reacting an amine alkene halide reagent with starch.

The reagent of U.S. Pat. No. 3,624,070 is prepared by mixing an amine with a dihaloalkene in the presence of a non-polar solvent until a quaternary ammonium salt is formed. The salt is collected by filtration and washed to remove unreacted reagents. The granular salt is packaged in bags or drums and is subject to forming lumps that must be broken up before use. The exposure of production workers to the granular salt, both in the plant and in the starch reacting facility, requires the use of protective wearing apparel when handling the granular amine alkene halide reagent. This is inconvenient, uncomfortable and may be ignored by the workers to their detriment.

The present invention relates to a method of producing amine alkene halide reagent which results in an aqueous solution of the amine alkene halide reagent. This water solution permits the handling of the amine alkene halide with ease and safety. The liquid can be pumped, shipped, stored and used, without ever coming in direct contact with the worker. The practice of this invention reduces the costs of the solvents required in the process of making the amine alkene halide because the solvents are recovered and reused.

SUMMARY OF THE INVENTION

The production of an aqueous solution of a quaternary ammonium alkene halide reagent which can be used in the production of cationic starch is accomplished economically and efficiently by the process of this invention. The process of this invention eliminates the centrifugation and drying steps in the prior art process of making the reagent. The liquid solution provides for a safe and facile utilization of the amine alkene halide. The present invention further comprises the making of a starch etherifying agent by reacting an amine, preferably a tertiary amine, or an amine salt with a dihaloalkene preferably 1,4-dichlorobuene-2, in an acetone solvent, adding water and removing the acetone solvent.

DETAILED DESCRIPTION

This invention involves the production of a reagent that is useful in the production of quaternary ammonium starch ethers. The quaternary ammonium starch ethers are utilized in the sizing of cellulosic fibers, such as paper pulp, cotton textiles, etc., and other related applications.

The processes of U.S. Pat. No. 3,624,070 and this invention both involve the reaction of a dihaloalkene with an amine or an amine salt to form a quaternary ammonium alkene halide which is reacted wth starch to form a starch ether. Nitrogenated derivatives capable of etherifying with starch may be prepared by reacting 1,4-dichlorobutene-2 with an amine or amine salt; however, tertiary amines are best suited for the reaction. Tertiary amines, under the conditions used, do not further react with halides to form a variety of products as do the primary and secondary amines, thereby reducing the yields and purity of the reagent.

Tertiary amines may be represented by the formula:

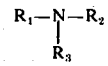

wherein $R_1$, $R_2$ and $R_3$ are from the group consisting of alkyl, substituted alkyl, alkene, aryl, or aralkyl.

Of the tertiary amines, trimethylamine offers the most advantages not only because of its reactivity in this reaction but also because it is most economical.

The most practical of all the alkene radicals useful in this invention is the butene radical, although other conjugated alkene radicals of the symmetrical structure such as hexadiene-2,4 and octatriene-2,4,6 will react in the same way.

The reaction product of a bifunctional alkyl halide and an amine may be represented by the structural formula:

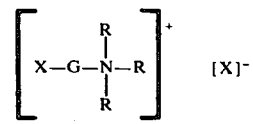

wherein X is halide, R is methyl or ethyl, and G is alkenylene of 2 to 4 carbons.

More specifically, the reaction between dichlorobutene and trimethylamine to yield the product of this invention is represented as follows:

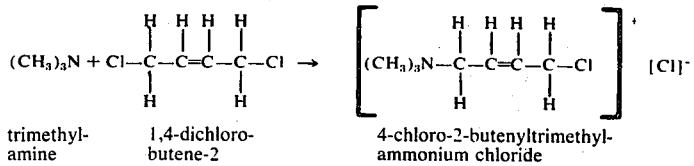

trimethylamine    1,4-dichlorobutene-2    4-chloro-2-butenyltrimethylammonium chloride The preferred embodiment of the process of this invention is similar to the process of U.S. Pat. No. 3,624,070, but there are critical differences. To produce the 4-chloro-2-butenyltrimethylammonium chloride (TAC) in water, about 124.9 parts to about 125 parts of 1,4-dichlorobutene-2 and about 59 to about 60 parts of trimethylamine are mixed in a reactor for about 5 to about 7 hours at 75° to about 80°C. in the presence of about 700 to about 750 parts acetone.

In the conventional process, 4-chloro-2-butenyltrimethylammonium chloride is recovered from the acetone solvent reaction mixture by filtration and followed by a drying step. The process of the present invention provides for the vacuum stripping of the acetone from the reaction mixture and recovering the acetone using a brine cooled condenser and receiver. The vacuum distillation process has a reduced pressure of about 150 to about 270 mm Hg and temperature of about 30°C. The reaction yields about 95 to about 99% 4-chloro-2-butenyltrimethylammonium chloride in about a 74 to about 75% by weight concentration in water.

Stability studies have indicated that the aqueous 4-chloro-2-butenyltrimethylammonium chloride solution is relatively stable at low temperatures but tends to decompose at higher temperatures. The 4-chloro-2-butenyltrimethylammonium chloride solution may be stored at or below room temperature without undergoing a large degree of hydrolysis. The 4-chloro-2-butenyltrimethylammonium chloride solution should be stored under refrigeration particularly during the summer months and when stored for extensive periods of time.

Alternative processes for the practice of this invention include the use of non-polar solvents such as toluene and hexane. The solvent is the vehicle for the reaction between trimethylamine and 1,4-dichlorobutene-2. Water is added subsequent to alkylation and the solvent layer is separated and decanted. The solvent can be purified for reuse by azeotropic distillation or by a desiccant. The use of these solvents does not produce yields of product as high as the acetone solvent. Another alternative process for the practice of this invention includes the use of a polar water immiscible organic solvent, such as, 2-hexanone (B.P. 127°C.), where the solvent is the medium for the trimethylamine 1,4-dichlorobutene-2 reaction, and the product, 4-chloro-2-butenyltrimethylammonium chloride, is recovered by extracting the organic solvent phase with water. The yields were comparable with the acetone solvent method.

The final product comprises about 18% to about 25% water and about 82% to about 75% amine butene halide. It has a specific gravity of about 1.126 to about 1.114 and a viscosity of about 75 cps to about 25 cps (centipoise).

The following are specific examples of the present invention:

EXAMPLE I

This example illustrates the use of an acetone solvent system to produce a 95% to about 99% yield 4-chloro-2-butenyltrimethylammonium chloride. The product is recovered as a 75% (by weight) 4-chloro-2-butenyltrimethylammonium chloride in water solution. This has the consistency of syrup, which avoids a splashing problem in handling.

About 60 parts trimethylamine and 125 parts 1,4-dichlorobutene-2 are mixed with 700 parts acetone in a stainless steel pressure reactor. The mixture is allowed to react for 5 hours at a temperature of about 75°C. to about 80°C. Next, 60 parts water are added to the cooled reaction mixture. This mixture yields about 96% 4-chloro-2-butenyltrimethylammonium chloride.

The acetone is removed by vacuum distillation. The pressure is reduced to 270 mm Hg and the temperature maintained at 30°C. to remove the acetone and it is recovered using a brine cooled condenser and receiver. About 93% of the acetone is recovered for reuse.

The 4-chloro-2-butenyltrimethylammonium chloride comprises about 75% by weight of an aqueous solution, which can be refrigerated and stored for an extended period of time.

EXAMPLE II

This example shows the use of a 2-hexanone organic solvent system to produce a 75% by weight 4-chloro-2-butenyltrimethylammonium chloride yields in a 75% by weight 4-chloro-2-butenyltrimethylammonium chloride in water solution.

About 125 parts 1,4-dichlorobutene-2 and 60 parts trimethylamine are mixed with 700 parts 2-hexanone in a stainless steel pressure reactor. The mixture is allowed to react for 5 hours at a temperature of about 75°C. to about 80°C. Next, 60 parts of water are added to the cooled reaction mixture. This mixture yields about 93.5% 4-chloro-2-butenyltrimethylammonium chloride. The 2-hexanone is removed either by vacuum distillation or separated by decantation from the reaction mixture. About 95% of the 2-hexanone is recovered for reuse.

EXAMPLE III

This example shows the use of a toluene solvent system to produce a 74% to about 75% by weight 4-chloro-2-butenyltrimethylammonium chloride yield in a 75% by weight 4-chloro-2-butenyltrimethylammonium chloride in water solution.

About 125 parts of 1,4-dichlorobutene-2 and 60 parts of trimethylamine are mixed with 700 parts toluene. This mixture is allowed to react (reflux) at 110°C. for 18 hours. This mixture yields about 82% 4-chloro-2-butenyltrimethylammonium chloride.

Next, about 60 parts of water is added to the mixture to form a 75% 4-chloro-2-butenyltrimethylammonium chloride in water solution. The toluene is decanted from the mixture and subjected to azeotropic distillation to further remove water from the toluene solvent. About 95% of the toluene is recovered for reuse.

The 75% 4-chloro-2-butenyltrimethylammonium chloride solution is ready for use.

EXAMPLE IV

This example illustrates the use of a hexane solvent system to produce about a 74% to about 75% by weight 4-chloro-2-butenyltrimethylammonium chloride yield in a 75% by weight 4-chloro-2-butenyltrimethylammonium chloride water solution.

About 59 parts trimethylamine and 125 parts 1,4-dichlorobute-2 are mixed with 700 parts hexane. The mixture is allowed to react in a sealed system for 5 hours at a temperature of about 75°C. to about 80°C. Next, about 60 parts water are added to the cooled reaction mixture. This mixture yields about 74 to 75% by weight 4-chloro-2-butenyltrimethylammonium chloride.

The water immiscible hexane layer is separated, decanted, and dried over a desiccant. It is then ready for reuse. About 95% of the hexane is recovered. The 4-chloro-2-butenyltrimethylammonium chloride comprises about 75% by weight of an aqueous solution.

What is claimed is:

1. A method of making a water solution of an amine alkene halide comprising the steps of reacting a dihaloalkene and a tertiary amine of the formula:

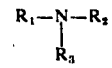

wherein $R_1$, $R_2$ and $R_3$ are from the group consisting of alkyl, substituted alkyl, alkene, aryl, or aralkyl in the presence of a solvent which is non-polar as compared to water, adding water to the reaction mixture, separating the solvent, and recovering the water based product.

2. The method of claim 1 wherein the reaction mixture is heated to about 75°C. to about 110°C.

3. The method of claim 1 wherein the time of the reaction is from about 5 to about 18 hours.

4. The method of claim 1 wherein from about 75% to about 96% water soluble 4-chloro-2-butenyltrimethylammonium chloride is recovered.

5. The method of claim 1 wherein the solvent is selected from a group consisting of acetone, hexane, toluene, and 2-hexanone (B.P. 127°C.).

6. The method of claim 1 wherein the dihaloalkene is 1,4-dichlorobutene-2.

7. A method of making a water solution of an amine alkene halide comprising the steps of:
   A. reacting about 124.9 parts to about 125 parts 1,4-dichlorobutene-2 and about 59 parts to about 60 parts trimethylamine in the presence of acetone,
   B. heating the reaction for sufficient time to produce a high percentage yield of 4-chloro-2-butenyltrimethylammonium chloride,
   C. adding water to the mixture, and
   D. separating the acetone from the reaction mixture.

8. The method of claim 7 wherein the acetone is separated by vacuum distillation.

9. A composition comprising from about 18% to about 25% water and about 82% to about 75% amine butene halide of the formula

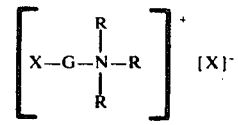

wherein X is halide, R is methyl or ethyl, and G is alkenylene or 2 to 4 carbon atoms, said composition having a specific gravity of about 1.126 to about 1.114 and a viscosity of about 75 cps to about 25 cps.

10. The composition of claim 9 wherein the amine butene halide is 4-chloro-2-butenyltrimethylammonium chloride.

* * * * *